United States Patent [19]
Axworthy

[11] Patent Number: 4,892,978
[45] Date of Patent: Jan. 9, 1990

[54] SELF-SUPPORTING PEDESTAL

[76] Inventor: William Axworthy, P.O. Box 2628, Station "B", Richmond Hill, Ontario, Canada, L4E 1A6

[21] Appl. No.: 321,711

[22] Filed: Mar. 10, 1989

[51] Int. Cl.$^4$ ............................................. H02G 9/02
[52] U.S. Cl. ..................................................... 174/38
[58] Field of Search ............... 248/127, 158, 174, 176, 248/159; 52/298, 165; 174/37, 38

[56] References Cited

U.S. PATENT DOCUMENTS

| | | | |
|---|---|---|---|
| 3,162,718 | 12/1964 | Gunthel | 174/38 |
| 3,445,581 | 5/1969 | Barb | 174/38 |
| 3,466,379 | 9/1969 | Lohman | 174/38 |
| 3,480,721 | 11/1963 | Baumgartner | 174/38 |
| 3,538,236 | 11/1970 | Baumgartner | 174/38 |
| 3,604,835 | 9/1971 | Hamilton | 174/38 |
| 3,740,452 | 6/1973 | Bunten | 174/38 |
| 3,872,234 | 3/1975 | Smith | 174/38 |
| 3,913,876 | 10/1975 | McSherry | 248/903 |
| 3,991,264 | 11/1976 | Connell | 174/38 |
| 4,365,108 | 12/1982 | Bright | 174/37 |

FOREIGN PATENT DOCUMENTS 479419  8/1974  Australia ................................ 174/38

Primary Examiner—Ramon O. Ramirez
Assistant Examiner—Robert A. Olson
Attorney, Agent, or Firm—David W. Wong

[57] ABSTRACT

The pedestal is particularly suitable for housing cable television signal distribution outdoor equipment. It has a self-supporting base having a truncated pyramidal shape and a horizontal lower flange, which can be installed firmly and securely on the ground easily and quickly without the use of additional anchoring devices. The divergent base also provides inherent additional space for storing extra cable for future re-coring and changing equipment, and a plurality of the base units as well as a plurality of top cover units may be stacked together for maximum utilization of the shipping and storage space.

5 Claims, 2 Drawing Sheets

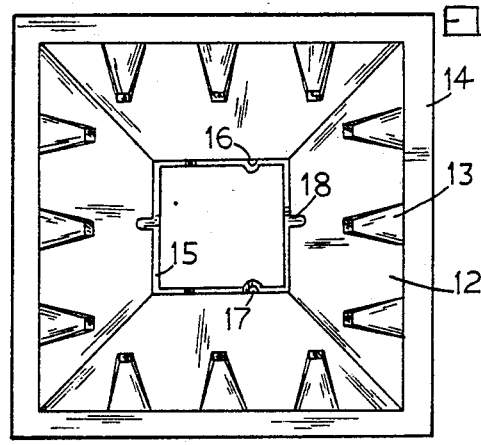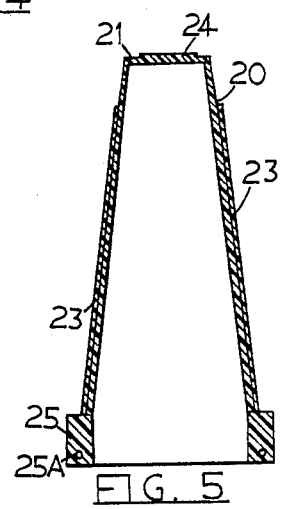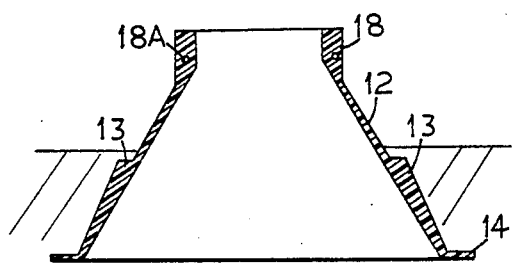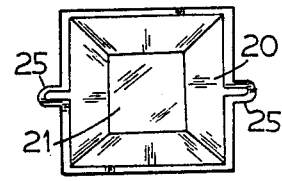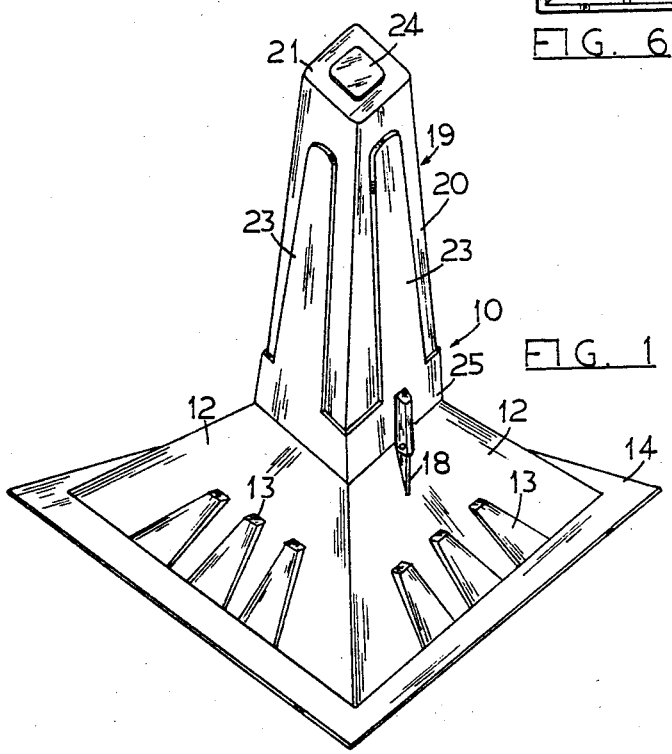

SELF-SUPPORTING PEDESTAL

BACKGROUND OF THE INVENTION

This invention relates to equipment enclosing pedestal and particularly relates to outdoor pedestal suitable for housing cable television signal distribution equipment.

In this distribution of cable television signals to subscribers, underground cable systems are laid throughout a wide area and signal re-distribution equipment is required to be located at various outdoor locations to supply the signals to the subscribers. Such re-distribution equipment must be housed in pedestals installed on the ground to prevent the equipment from exposing to weathering and physical abuse. Heretofore, generally rectangular shaped outdoor equipment pedestals have been employed for installing the signal distribution equipment. However, such electrical equipment pedestals are primarily designed for housing light-weight outdoor electrical equipment, and are thus unsuitable for housing the cable television equipment as such equipment is becoming increasingly larger in size and heavier in weight. In order to support the weight of the cable television equipment, a steel stake anchor is often driven into the ground to secure the pedestal upright on the ground. The pedestal is, in turn, bolted on the stake anchor. After a relatively short time, the bolts to the anchor and/or the anchor itself become worn and loosen, particularly, in cold climate installation areas, in which frosting and defrosting of the ground are common causing the anchor as well as the pedestal to move relative to the ground. Eventually, the pedestal becomes leaning on its base thus creating an unsightly object on the subscriber's lawns, and in worse cases the pedestal tips over to expose the installation. To avoid such problem, installers have been pouring a cement base around the pedestal to hold it securely; but such additional operation increases the expense in labour and material as well as the time required in the installation. Such method of installation still requires the use of an anchor stake. Another potential problem in the use of an anchor stake is the possibility of unknowing damages to other outdoor underground installations.

Due to the generally rectangular shape of the common pedestals, shipping and storing them requires a considerable amount of expense since they can not be stacked together and thus would take up a large amount of space.

Moreover, due to the restricted space provided in the pedestal, when it is necessary to change to a larger line extender in the re-distribution equipment, the energized line extender must be dismantled. This requirement adds to extra labour costs and must importantly causes disruption in service to the subscribers.

SUMMARY OF THE INVENTION

It is the primary object of the present invention to provide a cable television pedestal which can be installed easily and quickly without the use of anchor stake.

It is another object of the present invention to provide a pedestal which can accommodate future re-coring and changing of the re-distribution equipment.

It is yet another object of the present invention to provide a pedestal which has a unique shape to facilitate stacking for shipping and storage in order to occupy a minimum space.

BRIEF DESCRIPTION OF THE DRAWINGS

FIG. 1 is a perspective front elevation view of the pedestal according to the present invention.

FIG. 3 is a sectional side elevation view of the base unit thereof.

FIG. 4 is a top elevation view of the base unit thereof.

FIG. 5 is a sectional side elevation view of the top cover thereof.

FIG. 6 is a bottom elevation view of the top cover thereof.

DETAILED DESCRIPTION OF THE PREFERRED EMBODIMENTS

Figure 2:
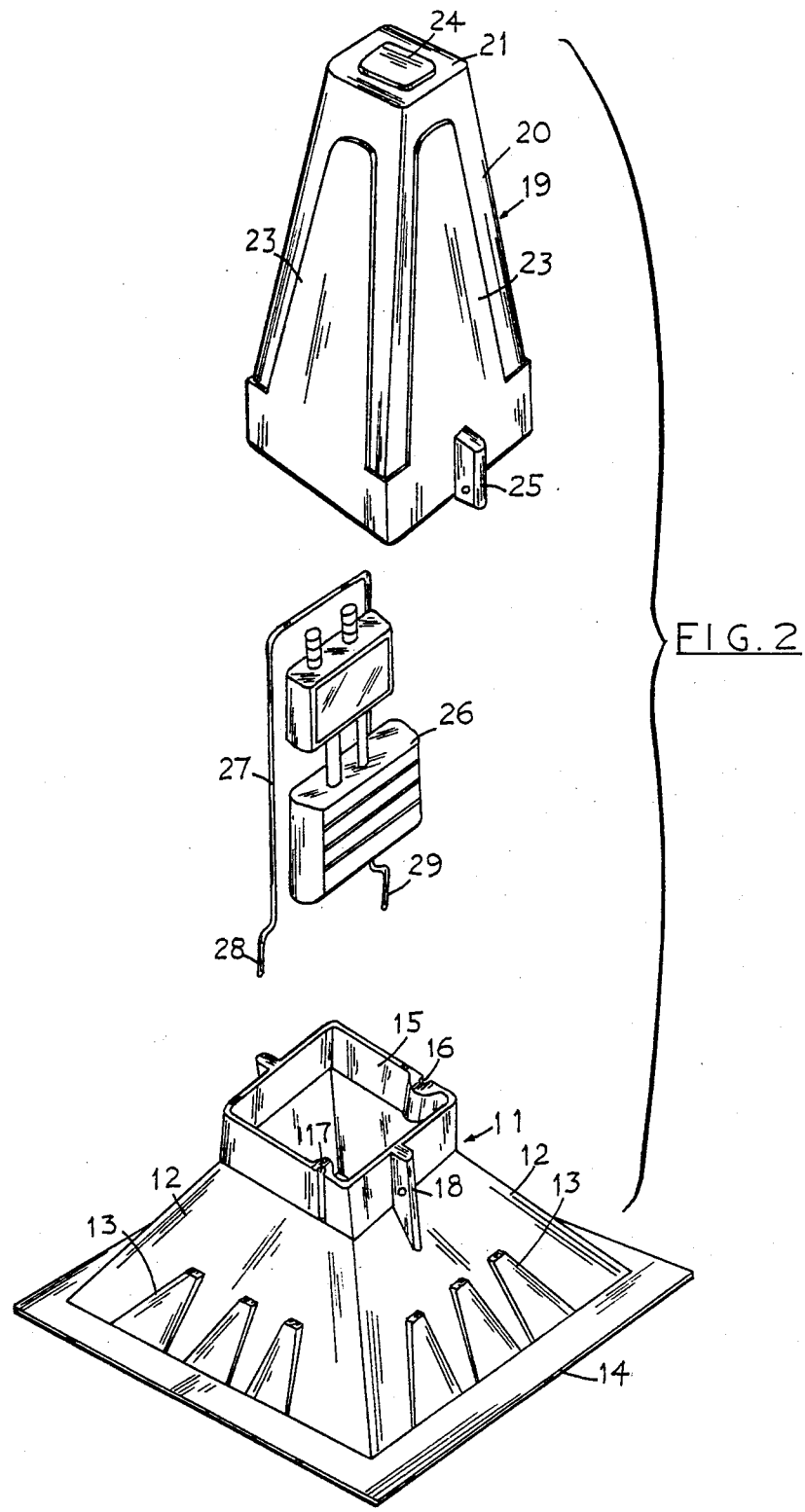
FIG. 2 is a front exploded view of the component parts of the pedestal.

With reference to the drawings wherein like reference numerals designate corresponding parts in the several views, the pedestal 10 according to the present invention has a generally square hollow base unit 11 having a truncated pyramidal shape with four side walls 12 sloping downwardly and outwardly in a divergent manner. At least two reinforcing ribs 13 are formed on each side wall 12 and extending approximately from the middle to the lower edge therein. The reinforcing ribs 13 preferably have a divergent shape towards the lower edge of the base unit 11. Horizontal flanges 14 are provided at the lower edge of the side walls An upstanding square collar 15 extends upwards from the top of the base unit 11. Two channels 16 and 17 are formed on two opposite sides of the upstanding collar 15, and at least one locking rib 18 and preferably two ribs 18 are formed on the remaining opposite sides therein.

The top cover 19 has an elongated truncated pyramidal shape with side walls 20 sloping gently downwardly and divergently from a square top panel 21 to a lower square bottom opening 22. Reinforcing patterns 23 may be formed on the side walls 20, and reinforcing pattern 24 may also be formed on the top panel 21. The bottom opening 22 of the top cover 19 is sized to engage with the upstanding collar 15 of the base unit 11. Two locking channelled bosses 25 are formed on two opposite sides of the lower edge portion of the top cover 19, which engage with the locking ribs 18 formed on the collar 15 when the top cover 19 is placed on to the base unit 11. A locking device may be used to secure the top cover 19 and the base unit 11 together through the locking openings 18A formed on the locking ribs 18 of the base unit 11 and associated locking openings 25A formed on the channelled bosses 25 of the top cover 19.

The cable television equipment 26 is mounted to an elongated inverted U-shaped bracket 27 which has two inverted L-shaped bottom leg portions slidably and movably engageable with the channels 16 and 17 respectively.

The base unit 11 and the top cover 19 may be fabricated of sturdy polyethylene plastic material which is resistant to ultra-violet light degradation, extreme temperature changes and all types of soil conditions as well as has a high impact strength.

The base unit 11 may be easily and quickly installed in the ground at any selected site by merely digging a shallow hole large enough to accommodate the horizontal flange 14 and to a depth of up to the top of the reinforcing ribs 13, the base unit 11 is then placed into the hole and the soil is replaced around the base unit as best shown in FIG. 3. The signal re-distribution equipment mounted on the U-shaped bracket 27 may then be inserted into the channels 16 and 17 to be mounted on the base unit 11 and connection of the equipment to the unground cables may then be made. When installation is completed the top cover 19 is disposed over the base unit 11 and is safely secured in place by any convenient locking means by means of the openings provided in the channelled bosses 25 on the top cover 19 and the locking ribs 18 on the base unit 11.

The divergent base unit 11 provides the support for the entire pedestal as well as the weight of the signal re-distribution equipment. It does not require staking as in known pedestals. The present pedestal is not subject to movement by the frosting and defrosting conditions due to the divergent shape of the base unit 11 and the anchoring effect of the horizontal flange 14 by the soil piling around it. Furthermore, the divergent shape of the base unit 11 enables extra length of the unground cable to be coiled within the base unit 11 to provide for future re-coring and changing of signal re-distribution equipment. Also, inherently, the large space of the divergent base unit 11 provides a relatively large space to work with the unground cable.

Moreover, the divergent shape of the base unit 11 and the top cover 19 enables a plurality of base units to be stacked together and a plurality of top covers to be stacked together for shipping and storage such that maximum utilization of the shipping and storage spacers can be achieved.

Obviously, numerous modifications and variations of the present invention are possible in light of the above teachings. It is therefore to be understood that within the scope of the appended claims, the invention may be practiced otherwise than as specifically described herein.

What is claimed is:

1. A self-supporting pedestal comprising, a hollow generally truncated pyramidal base unit having a square base and slanting side walls sloping upwardly to a square upper end, a square collar extending upwardly from said upper end and having two pairs of mutually parallel upstanding side walls, two channels formed in two opposite upstanding side walls of said square collar, horizontal flanges extending outwardly from said square base of said base unit, an inverted U-shaped bracket means having two lower leg members therein slidably and movably engageable with said channels in said upstanding side walls of said square collar, a top cover means operative to dispose over said base unit, said top cover means having a hollow truncated generally elongated pyramidal shape with slanting side walls sloping convergently upwardly to a closed square top panel and divergently downwardly to a square open bottom end.

2. A self-supporting pedestal according to claim 1 including locking rib means formed on two opposite upstanding side walls of said square collar, and two channel bosses formed on the edge portion of two opposite side of said open bottom end of said top cover, said channel bosses being operative to engage with said locking rib means when said top cover means is disposed over said base unit.

3. A self-supporting pedestal according to claim 2 including a plurality of reinforcing rib means formed on said sloping side walls of said base unit.

4. A self-supporting pedestal according to claim 3 wherein said top panel and side walls of said top cover means includes reinforcing means formed thereon.

5. A self-supporting pedestal according to claim 4 wherein said base unit and said top cover means are fabricated of polyethylene plastic material.

* * * * *